(No Model.)  2 Sheets—Sheet 1.
H. McFARLANE.
OIL TRANSPORTING TANK AND WAGON.
No. 436,840. Patented Sept. 23, 1890.
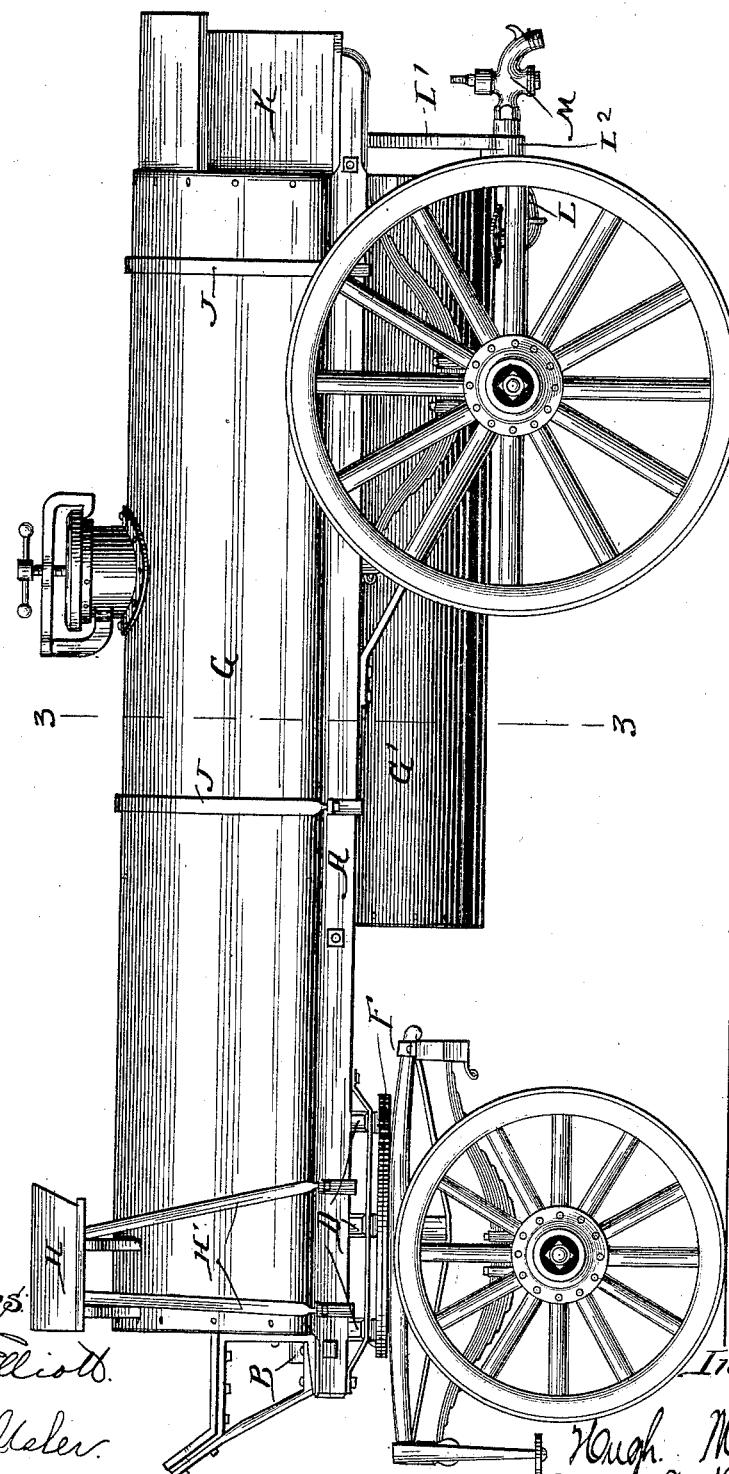

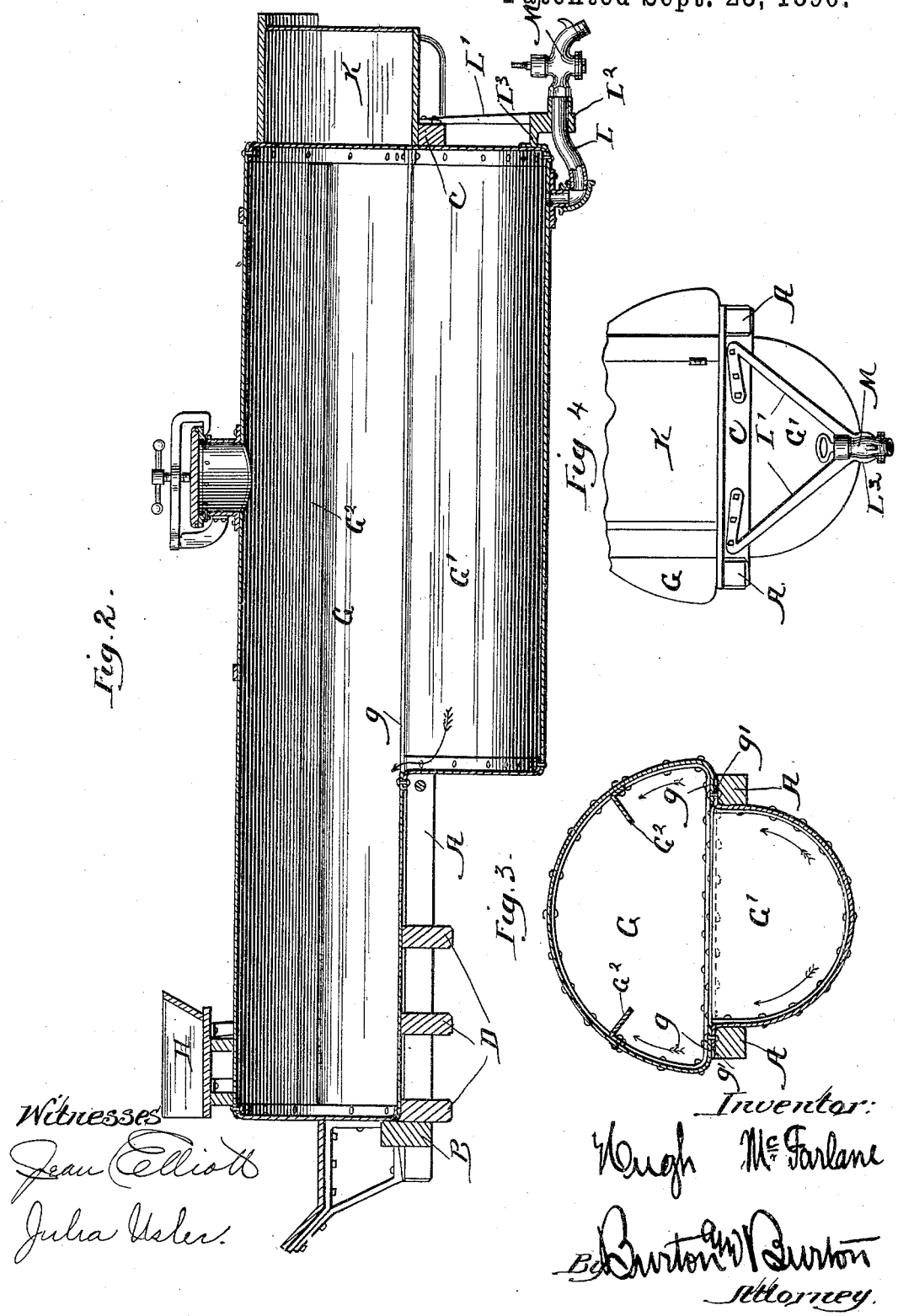

UNITED STATES PATENT OFFICE.

HUGH McFARLANE, OF CHICAGO, ILLINOIS.

OIL-TRANSPORTING TANK AND WAGON.

SPECIFICATION forming part of Letters Patent No. 436,810, dated September 23, 1890.

Application filed March 31, 1890. Serial No. 345,982. (No model.)

*To all whom it may concern:*

Be it known that I, HUGH McFARLANE, a citizen of the United States, residing at Chicago, county of Cook, and State of Illinois, have invented certain new and useful Improvements in an Oil-Transporting Tank and Wagon, which are fully set forth in the following specification, reference being had to the accompanying drawings, forming a part thereof.

The purpose of this invention is to provide an improved tank for carrying oil and similar substance which it is necessary to transport in thoroughly tight compartments on a wagon, as for delivery at retail. It is designed to overcome the difficulty found to exist with the cylindrical tanks mounted, as is usual, on a wagon truck or frame, that difficulty consisting in that the tank is necessarily supported so high above the wheel-axles that the lateral strain over uneven roads is very trying to the running-gear and to the wheels, making very great strength and frequent repairs necessary. I aim to remove or diminish this difficulty by constructing the tank of such form and so supporting it by reason of its form on the truck or frame that the center of gravity of the tank and its contents is very much lowered as compared with the prevailing forms.

In the drawings, Figure 1 is a side elevation. Fig. 2 is a long medial section. Fig. 3 is a transverse section at the line 3 3 on Fig. 1. Fig. 4 is a detail rear elevation showing means of sustaining and bracing the discharge-cock.

A A are longitudinal lateral sills of the truck-frame, which are tied together by the cross-tie B at the forward end and by the cross-tie C at the rear end, and, further, by the cross-sills D D D at the forward part, said sills constituting the bolsters pertaining to the front running-gear having the fifth-wheel or turn-table F secured to their under surfaces. The tank is made up of the upper semi-cylindrical portion G, whose horizontal diameter is such that it rests upon the side sills A A, and the length is that which can be accommodated on the truck-frame, said portion of the tank extending forward over the front running-gear and platform-springs, which rest on the front axle, and rearward over the rear axle as far as deemed desirable. Said tank comprises the further semi-cylindrical portion G', whose horizontal diameter is such that it extends between the said sills A A, fitting snugly between them, and whose length is such that, extending from the rear end of the upper semi-cylindrical portion G' forward over the rear axle and toward the running-gear, it allows room underneath the forward end of the truck and forward of said portion G' of the tank for the operation of the forward running-gear and springs in turning the same, permitting said springs to rotate underneath the forward end of the portion G' and forward of said lower portion of the tank. These two semi-cylindrical portions of the tank are suitably riveted together, the upper one G being formed with an inwardly-projecting flange $g$, which extends above the sills A A, and the lower one G' being provided with an outwardly-projecting flange $g'$, which laps underneath said flange $g$ and is riveted thereto, so that the tank, as a whole, is formed with downwardly-facing shoulders which rest upon the sills A A, the construction, as described, being such that said sills tend to support both the said semi-cylindrical portions of the tank, relieving said portions each from the support of the other, so that there is no strain upon their junction where their said flanges are riveted together by reason of the weight of said portions of the tank or of the contents; but, on the contrary, the entire weight of the upper tank tends to hold it down onto the lower tank, and the weight of the lower tank and of its contents has no tendency to pull it away from the upper. Said tanks are suitably joined after a manner familiar to boiler-makers, and the portion of the upper tank forward of the lower one is suitably bottomed, said bottom being suitably riveted to a flange formed at the upper edge of the forward head of the lower tank, making all junctions secure.

It will be observed that the structure described, whereby the upper tank rests its whole length upon and is throughout its whole length in contact with the sills A A, very greatly diminishes the danger of springing of said sills under the weight of the tank, as is the case when such tanks rest upon cross-sills only, because such cross-sills transmit the weight to the lateral sills at the points where they are joined thereto only, whereas in the structure herein shown the weight is distributed over the whole length of the cross-sills, and the longitudinal stiffness of the tubular tank becomes itself a source of strength in the entire structure more certainly and completely than if it were not in contact throughout its entire length with the supporting-sills. It will be seen, also, that the center of gravity of the entire tank is lower than it would be if it were supported wholly above the truck-frame, the latter being, as of necessity it is, above the level of the forward bolsters, which are of necessity above the level of the top of the forward wheels, in order to permit the forward running-gear to be properly turned, and that the gain in this respect is due, first, to forming the tank with the suspended portion G' extending as far forward as it can without interfering with the turning of the front running-gear, and, second, to forming the upper portion G of the described semi-cylindrical shape, whereby its weight is located mainly at the lower part of said portion near the sills.

The seat H is supported upon the top of the upper portion G of the tank at the forward end, being suitably tied down to the sills by the straps H'. As a precaution to prevent the displacement of the tank from the sills by severe jolting, it may be tied down to the sills by the straps J.

K is a can-receptacle, which is supported upon the rear cross-tie C against the rear end of the tank.

M is the discharge-cock for the tank, which I connect at the bottom instead of at the lower part of the rear end, as is more commonly done, and cause it to extend from that connection not higher at any point before its discharge than the inner surface of the bottom of the tank, whereby I am enabled to completely drain the tank. This discharge-cock is supported by the bracket L, which is formed of two arms L' L', diverging from the collar L², whereat the discharge-pipe is encircled and sustained upwardly to the cross-tie C, to which they are both bolted, thereby affording a slight additional fastening for the tank, tending to hold it down onto the truck-frame. To prevent the straining of the connection of this discharge-cock with the tank by endwise blows, which are liable to occur in backing the wagon to positions for discharge, I provide the bracket L with the rearwardly-projecting foot L³, which abuts against the end of the lower portion G' of the tank, close to the lower edge, where it is most effectively stiffened by the junction of the head with the semi-cylindrical body, so that such endwise blows, as above referred to, are received and resisted by the whole longitudinal strength of the portion G' of the tank at the point where it is strongest to resist such longitudinal strain.

As is known, in all large movable tanks and receptacles holding liquid the surging or rolling motion of the liquid in the tank when being moved not only makes transportation more difficult, but strains the running-gear or carriage parts of the vehicle. This detriment is partially alleviated in my form of tank by the uneven surface presented by shoulders comprising the two flanges g and g', and also by the forward head of the semi-cylindrical portion G'. To lessen this still further, I provide longitudinal inwardly-projecting ribs or flanges rigid with or securely fastened to the sides of the tank, shown in the drawings located in the portion A. As will be seen, this construction, consisting of the flanges G², shoulder g g', and head of the portion G', will tend to arrest the motion of the liquid, as shown by arrows in Figs. 2 and 3.

I claim—

1. In an oil-transporting wagon, in combination with the truck-frame comprising longitudinal sills, the tank consisting of two substantially semi-cylindrical portions, one of diameter adapted to enter between the sills and the other of diameter adapted to rest upon the sills, said portions having, respectively, outwardly and inwardly projecting flanges, whereby they are secured together, and which constitute downwardly-facing longitudinal shoulders, whereby said tank rests upon said sills, substantially as set forth.

2. In an oil-transporting wagon, in combination with the truck and the rotatable running-gear at the forward end thereof, said truck comprising longitudinal sills suitably tied together by cross-ties, and the tank consisting of a semi-cylindrical portion having its base downward and resting upon said longitudinal sills and extending above the forward running-gear, and the semi-cylindrical portion having its base upward and suspended between the sills rearward of the forward running-gear, said upper and lower semi-cylindrical portions having, respectively, inwardly and outwardly projecting flanges, whereby they are secured together, said flanges constituting longitudinal downwardly-facing shoulders, whereby said tank rests upon said sills, the lower tank being suspended by its said flanges from said sills and between the same, substantially as set forth.

3. In combination with the truck and the tank supported thereon, the discharge-cock connected into the bottom of the tank and extending rearward of the vertical plane of the rear end, the bracket comprising the diverging arms L', made fast to the truck-frame and to the discharge-cock, whereby said bracket and discharge-cock tend to tie the tank down onto the truck-frame, substantially as set forth.

4. In combination with the truck-frame and the tank supported thereon, the discharge-cock connected into the bottom of the tank and extending rearward of its rear end and the bracket L, which supports the rear end of the discharge-cock, having the foot L³ abutting against the rear end of the tank, substantially as and for the purpose set forth.

In testimony whereof I have hereunto set my hand, at Chicago, Illinois, in the presence of two witnesses.

HUGH McFARLANE.

Witnesses:
 KENNETH R. SMOOT,
 JEAN ELLIOTT.